US011387912B2

(12) United States Patent
Nakagawa et al.

(10) Patent No.: US 11,387,912 B2
(45) Date of Patent: Jul. 12, 2022

(54) WAVELENGTH CONVERTER AND FIBER OPTIC TRANSMISSION SYSTEM

(71) Applicant: FUJITSU LIMITED, Kawasaki (JP)

(72) Inventors: Goji Nakagawa, Sagamihara (JP); Tomoyuki Kato, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/952,776

(22) Filed: Nov. 19, 2020

(65) Prior Publication Data

US 2022/0158741 A1 May 19, 2022

(51) Int. Cl.
H04B 10/67 (2013.01)
H04J 14/02 (2006.01)
G02F 2/00 (2006.01)
G02F 1/35 (2006.01)
H04J 14/06 (2006.01)
G02B 27/10 (2006.01)

(52) U.S. Cl.
CPC ......... H04B 10/675 (2013.01); G02F 1/3519 (2013.01); G02F 2/004 (2013.01); H04J 14/0204 (2013.01); H04J 14/06 (2013.01); G02B 27/1006 (2013.01)

(58) Field of Classification Search
CPC .. H04B 10/675; H04B 10/532; H04B 10/548; G02F 1/3519; G02F 2/004; G02F 1/353; G02F 1/395; G02F 2201/02; G02F 2/006; G02F 2203/07; H04J 14/0204; H04J 14/06; G02B 27/1006
See application file for complete search history.

(56) References Cited

U.S. PATENT DOCUMENTS

| 5,495,366 | A | * | 2/1996 | Esman | G01D 5/344 |
| | | | | | 359/484.02 |
| 10,367,328 | B2 | * | 7/2019 | Peng | H01S 3/1112 |
| 11,211,707 | B1 | * | 12/2021 | Pourbeyram Kaleibar | |
| | | | | | G02F 2/006 |
| 11,268,811 | B2 | * | 3/2022 | Yao | G01C 19/72 |
| 2003/0043451 | A1 | * | 3/2003 | Kato | G02F 1/353 |
| | | | | | 359/326 |

(Continued)

FOREIGN PATENT DOCUMENTS

| JP | 5323396 | 12/1993 |
| JP | 201970725 | 5/2019 |
| JP | 2019197184 | 11/2019 |

Primary Examiner — Tanya T Motsinger
(74) Attorney, Agent, or Firm — Staas & Halsey LLP

(57) ABSTRACT

A wavelength converter that converts signal light and pump light into a light containing a new wavelength component using a nonlinear optical fiber, has a PBS for splitting incident light into a first polarized wave and a second polarized wave, a first polarization controller provided between the PBS and a first end of the nonlinear optical fiber, and a second polarization controller provided between the PBS and a second end of the nonlinear optical fiber, wherein in an optical loop connecting the PBS, the first polarization controller, the nonlinear optical fiber and the second polarization controller, the first polarized wave and a first component of the pump light travel through the nonlinear optical fiber in a first direction, and the second polarized wave and a second component of the pump light travel through the nonlinear optical fiber in a second direction opposite to the first direction.

15 Claims, 11 Drawing Sheets

(56) References Cited

U.S. PATENT DOCUMENTS

| | | | | |
|---|---|---|---|---|
| 2003/0063374 A1* | 4/2003 | Inoue | ............... | H01S 3/302 |
| | | | | 359/345 |
| 2008/0165412 A1* | 7/2008 | Watanabe | ............... | G02F 1/395 |
| | | | | 359/341.3 |
| 2010/0021105 A1* | 1/2010 | Watanabe | ............... | G02F 1/395 |
| | | | | 385/11 |
| 2010/0309469 A1* | 12/2010 | Kanter | ............... | H04B 10/70 |
| | | | | 356/364 |
| 2012/0020665 A1* | 1/2012 | Watanabe | ............... | G02F 2/004 |
| | | | | 398/65 |
| 2013/0101248 A1* | 4/2013 | Takasaka | ............. | G02B 6/2793 |
| | | | | 385/11 |
| 2016/0003669 A1* | 1/2016 | Lee | ............... | G01H 9/004 |
| | | | | 73/655 |
| 2016/0172818 A1* | 6/2016 | Takasaka | ............ | H04J 14/0221 |
| | | | | 398/81 |
| 2016/0245713 A1* | 8/2016 | Lee | ............... | G02B 6/024 |
| 2018/0231870 A1* | 8/2018 | Takasaka | ............... | G02F 1/39 |
| 2019/0049232 A1* | 2/2019 | Vakoc | ............... | A61B 5/0066 |
| 2019/0109666 A1* | 4/2019 | Kato | ............... | H04B 10/506 |
| 2019/0346738 A1 | 11/2019 | Takeyama et al. | | |
| 2020/0287345 A1* | 9/2020 | Lowder | ............... | H01S 3/06712 |

\* cited by examiner

WAVELENGTH CONVERTER AND FIBER OPTIC TRANSMISSION SYSTEM

TECHNICAL FIELD

The present disclosure relates to a wavelength converter and a fiber optic transmission system.

BACKGROUND

One solution for increasing the data transmission capacity is to increase the number of channels by means of wavelength division multiplexing (WDM). The data transmission capacity can also be increased by expanding the optical communication band from the conventionally used C-band to L-band and S-band which are adjacent to the C-band on the longer wavelength side and the shorter wavelength side, respectively. However, it is difficult and costly to produce new devices or components such as optical transmitters/receivers, wavelength duplexers, optical amplifiers or the like, while satisfying required performance, for the L-band and the S-band. So, another approach to expanding the communication band is now being studied and discussed, which is a technique of wavelength conversion using conventional C-band devices or components with satisfactory characteristics.

In wavelength conversion, signal light and pump light are incident on a nonlinear optical medium, and a new frequency or wavelength component is generated by the nonlinear effect including four-wave mixing, optical parametric amplification, etc. For a nonlinear medium used in wavelength conversion, a highly nonlinear optical fiber (HNLF) compatible with fiber optics is used. There are two types of HNLF, a polarization-maintaining fiber (PMF) and a non-polarization-maintaining fiber (NON-PMF). PMF has significantly different refractive indexes with respect to transverse and longitudinal polarizations in a cross-section perpendicular to the optical axis. NON-PMF is an optically isotropic medium having almost the same refractive index with respect to transverse and longitudinal polarizations across the cross-section.

In a PMF-type HNLF, the travelling speed is different between the X-polarized wave and the Y-polarized wave, and accordingly, propagation delay occurs between the two polarizations. Even when the polarized directions of the signal light and the pump light are maintained orthogonal to each other during the wavelength conversion, the nonlinear interaction between the signal light and the pump light may be degraded as the two lights travel through the HNLF, and the wavelength conversion efficiency may decrease. Accordingly, a NON-PMF type HNLF is generally used for wavelength conversion.

In fact, even with a NON-PMF type fiber, it is difficult to make the cross-sectional shape of the fiber into a completely isotropic circle, and a small amount of asymmetry still remains. In an optical fiber implemented in a wavelength converter, the refractive index may vary due to externally applied asymmetric pressure or twist. Due to these factors, even a NON-PMF type HNLF has a little birefringence. Besides, when a nonlinear optical fiber is wound around a small reel in response to the general demand for downsizing of devices, the cross-sectional shape of the fiber becomes slightly elliptical and polarization mode dispersion occurs, and the conversion efficiency decreases inevitably. Improvement of wavelength conversion efficiency is desired.

A structure for splitting input light into two polarized waves by a polarization beam splitter/combiner (hereinafter referred to simply as "PBS") and let the two polarized waves travel in the clockwise and counterclockwise directions and be incident on a nonlinear optical medium from the opposite directions is proposed. See, for example, Japan Patent Application Laid-Open Publication No. 2019-70725. In this structure, one polarization controller is inserted between the PBS and the nonlinear optical medium.

SUMMARY

According to one aspect of the disclosure, a wavelength converter has an input port configured to input a signal light and a pump light, an output port configured to output a converted light having a wavelength component different from the signal light and from the pump light, a nonlinear optical fiber that has a nonlinear optical effect, a polarization beam splitter configured to split incident light into a first polarized wave and a second polarized wave, a first polarization controller provided between the polarization beam splitter and a first end of the nonlinear optical fiber, and a second polarization controller provided between the polarization beam splitter and a second end of the nonlinear optical fiber, wherein in an optical loop connecting the polarization beam splitter, the first polarization controller, the nonlinear optical fiber, and the second polarization controller, the first polarized wave and a first component of the pump light travel through the nonlinear optical fiber in a first direction, and the second polarized wave and a second component of the pump light travel through the nonlinear optical fiber in a second direction opposite to the first direction.

The object and advantages of the invention will be realized and attained by means of the elements and combinations particularly pointed out in the claims. It is to be understood that both the foregoing general description and the following detailed description are exemplary and explanatory and are not restrictive to the invention as claimed.

DESCRIPTION OF EMBODIMENTS

Figure 1:
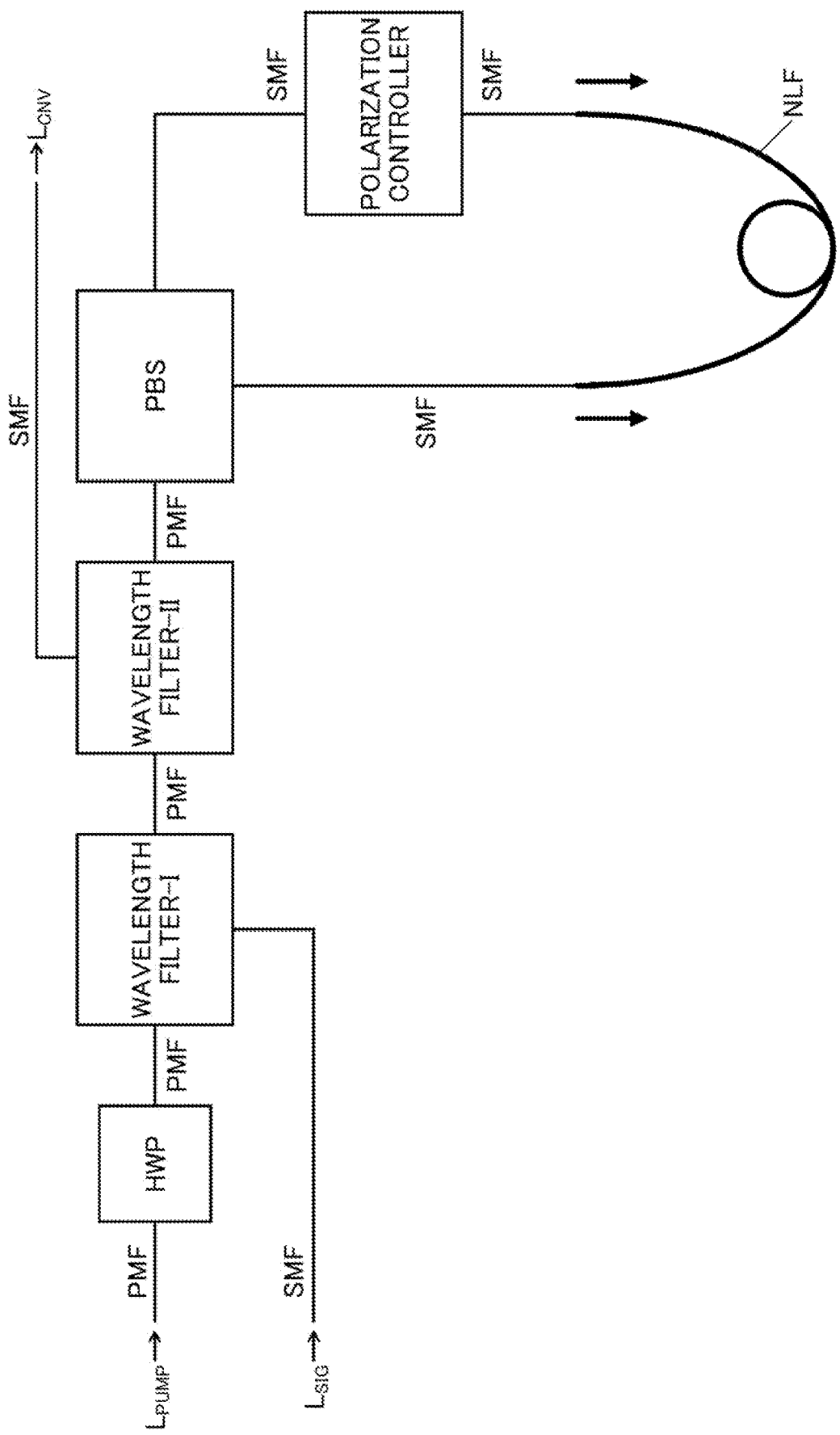
FIG. 1 is a diagram for explaining a technical problem arising in a conventional structure of wavelength conversion.

Prior to describing detailed configurations of embodiments, a technical problem arising in the conventional technique using a wavelength converter is explained with reference to FIG. 1. FIG. 1 is a diagram reconfiguring the structure of a wavelength converter for the purpose of explaining the technical problem. In order to split or combine a signal light $L_{SIG}$, a pump light $L_{PUMP}$ and a converted light $L_{CNV}$, optical devices such as a half-wavelength plate (HWP), a wavelength filter-I, a wavelength filter-II, and PBS are used as illustrated in FIG. 1.

The signal light $L_{SIG}$ is input to the wavelength filter-I through a single mode fiber (SMF) and combined with the pump light $L_{PUMP}$ input through a PMF. The pump light $L_{PUMP}$ is regulated by the HWP so as to be incident on the PBS at a polarization angle of 45 degrees, while the signal light $L_{SIG}$ contains various polarization components. Upon entering the PBS, the incident light including the signal light $L_{SIG}$ and the pump light $L_{PUMP}$ is split into two orthogonally polarized waves, while maintaining the polarization directions of the signal light $L_{SIG}$ and the pump light $L_{PUMP}$ matching with each other. The two polarized waves are input to the nonlinear optical fiber (NLF) from opposite directions, and a converted light $L_{CNV}$ having a new wavelength component is generated. The NLF is a NON-PMF with an isotropic refractive index distribution in the cross section of the fiber. The two polarized waves that contain newly generated wavelength-converted components are combined by the PBS. The converted light $L_{CNC}$ is extracted by the wavelength filter-II and output to the SMF.

Separation and merging of polarized waves using PBS is called polarization diversity. One polarization controller is placed in the polarization diversity configuration to bring the polarization angles of the respective polarized waves passing through the NLF in opposite directions in alignment with the polarization axes of the PBS. The polarization controller regulates the polarization state of the travelling light such that the power of the converted light $L_{CNV}$ is maximized, in other words, such that the optical loss at the PBS is minimized; however, the polarization state inside the NLF cannot be controlled.

Because the NLF has almost no polarization dependence, there has not been a problem so far even through the polarization state in the NLF cannot be controlled. However, when an NLF with a length of several tens to hundred meters is wound around a small reel with a diameter of about 10 cm according to the recent demand for downsizing, a compressive stress is applied to the NLF in a direction parallel to the winding axis, and the cross-sectional shape of the NLF becomes slightly elliptical. The distortion of the NLF cross-section causes polarization mode dispersion, and the conversion efficiency decreases. More specifically, frequency-dependent polarization rotation and polarization-dependent wavelength dispersion, which constitute the secondary polarization mode dispersion, will occur. As a result, polarization mismatching and phase mismatching occur between the incident light on the NLF and the generated converted light, and the conversion efficiency decreases.

Figure 2A:
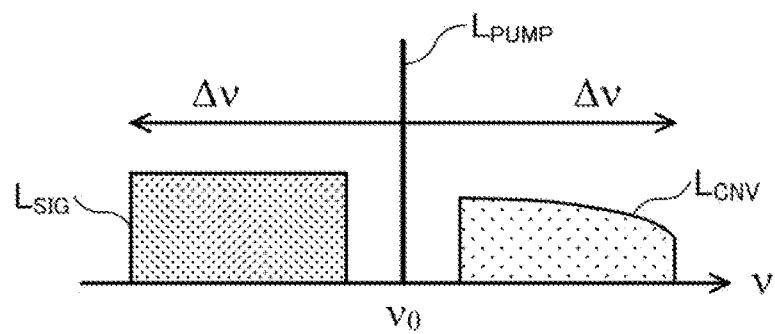
FIG. 2A illustrates decline in the conversion efficiency in wavelength conversion.
Figure 2B:
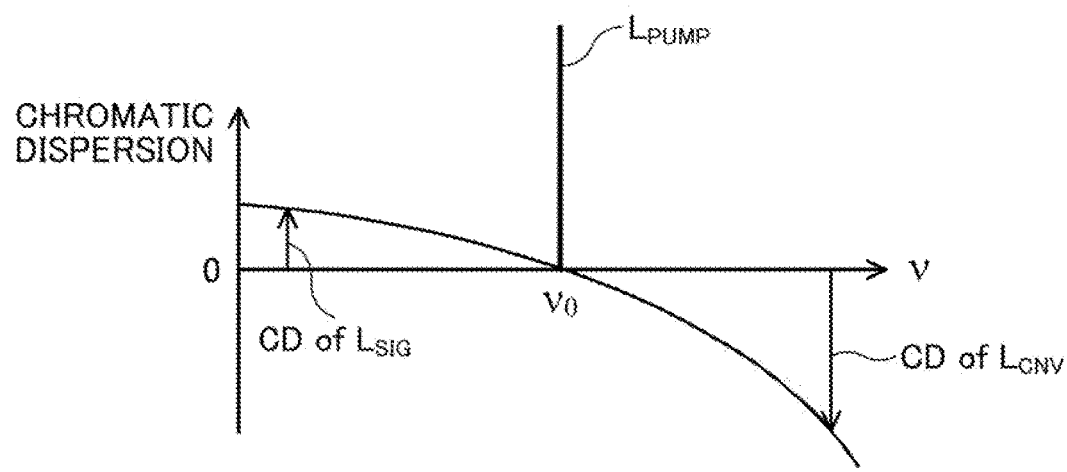
FIG. 2B illustrates phase mismatching between signal light and pump light due to chromatic dispersion.
Figure 2C:
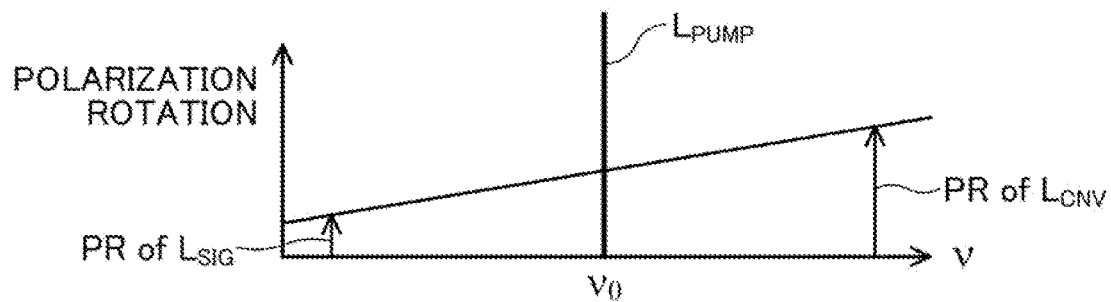
FIG. 2C illustrates disagreement of polarization rotation between signal light and pump light.

FIG. 2A illustrates a decrease in conversion efficiency in wavelength conversion, FIG. 2B illustrates phase mismatching between signal light and converted light due to wavelength dispersion, and FIG. 2C illustrates mismatching of the amount of polarization rotation between signal light and converted light. As illustrated in FIG. 2A, when the signal light $L_{SIG}$ and the pump light $L_{PUMP}$ are incident on the nonlinear optical medium, a converted light $L_{CNV}$ containing a new wavelength component that is different from the signal light $L_{SIG}$ and from the pump light $L_{PUMP}$ is generated due to the nonlinear optical effect. When a light wave with a sufficient intensity is incident on a nonlinear optical medium, the second- or higher order nonlinearity or polarization is generated inside the nonlinear optical medium with respect to the incident electric field, and due to the vibration of the polarization, light wave(s) with one or more frequency components different from the incident light are generated.

When wavelength conversion is applied to WDM, multiple wavelengths of light are collectively converted, and accordingly, a characteristic for wideband wavelength conversion is required. In general, by setting the wavelength of the pump light $L_{PUMP}$ to the zero-dispersion wavelength ν0, the intensity of the converted signal light can be maintained high. However, when the cross-sectional shape of a nonlinear optical fiber wound in a small circle deforms to be slightly elliptical and when birefringence occurs, the spectrum of the converted light $L_{CNV}$ is degraded due to wavelength dispersion and frequency-dependent polarization rotation during the wideband wavelength conversion, and the conversion efficiency decreases.

When a single-wavelength pump light $L_{PUMP}$ is used as illustrated in FIG. 2A, the spectrum of the converted light $L_{CNV}$ is degraded at the end portion of the band far from the wavelength of the pump light $L_{PUMP}$, and the conversion efficiency is lowered. As illustrated in FIG. 2B, the difference in the amount of wavelength dispersion (denoted as chromatic dispersion "CD" in the figure) between the signal light $L_{SIG}$ and the converted light $L_{CNV}$ becomes remarkable at the end portion of the band far from the wavelength of the pump light $L_{PUMP}$. Due to this phase mismatching, the spectrum of the converted light is deteriorated, the conversion efficiency declines, and the wideband wavelength conversion becomes difficult.

As illustrated in FIG. 2C, the birefringence generated in the NLF may cause frequency-dependent polarization rotation in the light travelling through the NLF. The conversion efficiency is lowered due to the discrepancy of the polarization rotation (PR) between the signal light $L_{SIG}$ and the converted light $L_{CNV}$. Maintaining the polarization matching between the signal light and the converted light over a predetermined wavelength band will achieve a wide-band and high-efficiency wavelength conversion.

Figure 3:
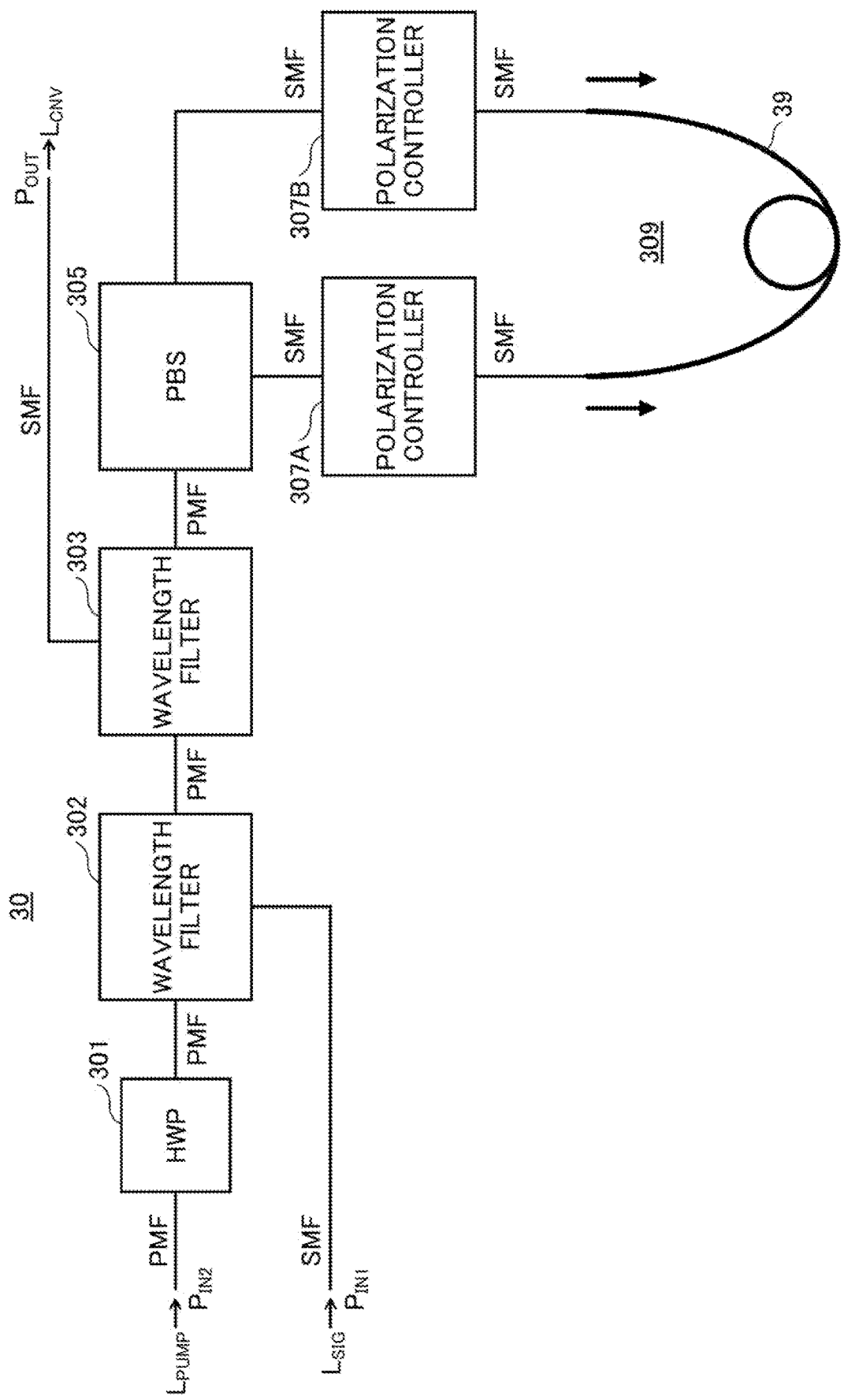
FIG. 3 illustrates a basic configuration of a wavelength converter according to an embodiment.

FIG. 3 illustrates a basic configuration of the wavelength converter 30 of an embodiment. The wavelength converter 30 suppresses at least frequency-dependent polarization rotation and maintains the satisfactory conversion efficiency.

Specifically, in an optical loop 309 for polarization diversity that includes PBS 305 and NLF 39, polarization controllers 307A and 307B are provided on both sides of the NLF 39.

The wavelength converter 30 has an input port $P_{IN1}$ for inputting signal light $L_{SIG}$ and an input port $P_{IN2}$ for inputting pump light $L_{PUMP}$. The signal light $L_{SIG}$ incident on the input port $P_{IN1}$ travels through the SMF and enters the wavelength filter 302. The pump light $L_{PUMP}$ incident on the input port $P_{IN2}$ is subjected to polarization direction adjusting at HWP 301, and guided to the wavelength filter 302 through the PMF. The signal light $L_{SIG}$ and the pump light $L_{PUMP}$ combined at the wavelength filter 302 then pass through the wavelength filter 303 and enter the PBS 305.

The light containing the signal light $L_{SIG}$ and the pump light $L_{PUMP}$ is split into two orthogonal polarized waves by the PBS 305. The first polarized wave transmitted through the PBS 305 travels along the optical loop 309 in the clockwise direction, and is subjected to polarization control by the polarization controller 307B before entering the NLF 39. By the control of the polarization controller 307B, the polarization direction of the first polarized wave incident on the NLF 39 is aligned with the optical axis of the NLF 39 determined by the birefringence having occurred in the NLF 39. Even when birefringence is generated in the NLF 39 due to stress, the refractive index difference between the vertical (or longitudinal) and horizontal (or transverse) directions in the fiber cross section becomes insignificant for the travelling light owing to the alignment between the polarization axis and the optical axis given by the birefringence, and consequently, frequency-dependent polarization rotation can be suppressed. To be more specific, the optical axis given by the birefringence is the major axis of birefringence. When the major axis of birefringence is in the vertical direction of the fiber cross section, the polarization axis is brought into alignment with the vertical direction so as not to be affected by the refractive index of horizontal direction, and thus the frequency-dependent polarization rotation can be suppressed. The polarization controller 307A brings the polarization direction of the light emitted from the NLF 39 and containing a converted light component into alignment with the reflecting axis of the PBS 305.

On the other hand, the second polarized wave reflected by the PBS 305 travels along the optical loop 309 in the counterclockwise direction, and is subjected to polarization control at the polarization controller 307A, and then incident on the NLF 39 from the opposite direction. The polarization controller 307A controls the polarization direction of the second polarized wave so as to match with the optical axis of birefringence generated in the NLF 39. Then the polarization controller 307B brings the polarization direction of the light emitted from the NLF 39 and containing a converted light component into alignment with the transmission axis of the PBS 305. The above-described behaviors of polarization control on the first and second polarized waves split by the PBS 305 similarly apply to the polarized lights travelling in the opposite directions, because performances of the PBS 305 and the polarization controllers 307A and 307B are reversible with respect to the travelling light. The polarization control carried out in the clockwise or the counterclockwise directions is the same process, and the control on either direction results in the same effect.

The polarization controllers 307A and 307B may be formed of any optical devices or elements capable of rotating the polarization direction. For example, a combination of an HWP and a quarter wave plate (QWP) may be employed.

The two light waves travelling through the optical loop 309 in opposite directions, each containing converted light $L_{CNV}$, are combined by the PBS 305 and then incident on the wavelength filter 303. The converted light $L_{CNV}$ is extracted by the wavelength filter 303 and output from the output port $P_{OUT}$. The polarization controllers 307A and 307B control the polarization state of the lights passing through the NLF 39 in opposite directions such that the output power of the converted light $L_{CNV}$ becomes the maximum, and that the optical loss due to the PBS is minimized, whereby the wavelength conversion efficiency can be improved.

The wavelength converter 30 may include a reel for winding the NLF 39. The diameter of the reel may be as small as 1/2000 to 1/10000 of the length of the NLF 39. The NLF 39 wound around the reel may be provided in a package together with other optical devices including the polarization controllers 307A and 307B, the PBS 305, the wavelength filters 302 and 303, and the HWP 301 to assemble a wavelength conversion module.

Figure 4:
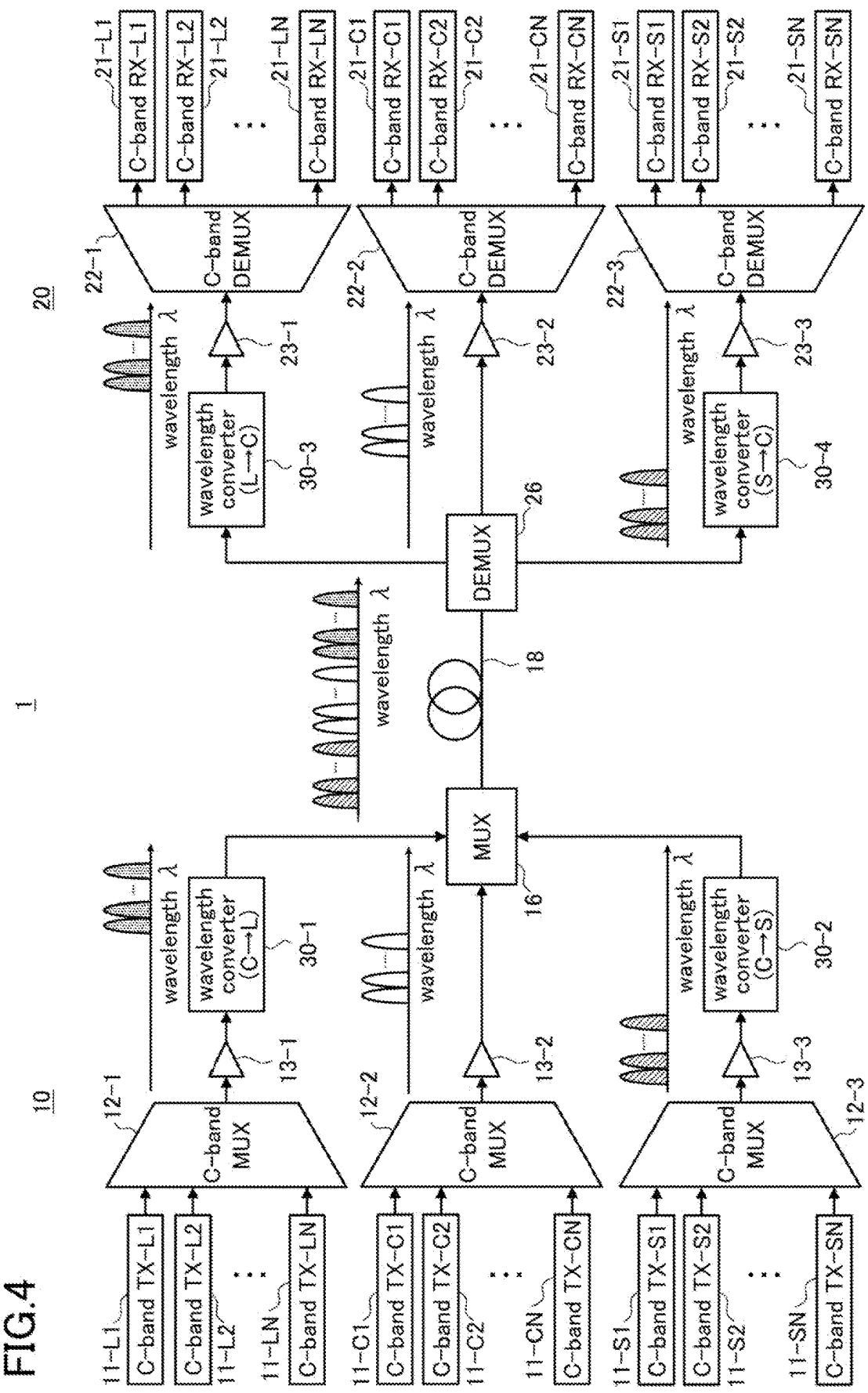
FIG. 4 is a schematic diagram of a fiber optic transmission system using a wavelength conversion technique.

FIG. 4 is a schematic diagram of a fiber optic transmission system 1 to which the wavelength converter 30 is applied. The fiber optic transmission system 1 carries out, for example, WDM-based optical communication. The fiber optic transmission system 1 includes an optical communication apparatus 10 at a transmitter side, an optical communication apparatus 20 at a receiver side, and an optical transmission line 18 connecting between them. The optical communication apparatus 10 and the optical communication apparatus 20 have the same configuration, and each of them has both a transmitter block and a receiver block. Here, explanation is made focusing on the transmitter block of the optical communication apparatus 10 and the receiver block of the optical communication apparatus 20 as a matter of convenience.

The optical communication apparatus 10 has optical transmitters 11-L1 to 11-LN of a first group, optical transmitters 11-C1 to 11-CN of a second group, and optical transmitters 11-S1 to 11-SN of a third group, which may be collectively referred to as "optical transmitters 11". These optical transmitters 11 may be, for example, electrical to optical converting frontend circuits of optical transponders. The plurality of optical transmitters 11 have the same configuration, and are configured to output signals of, for example, WDM signals of the C-band (for 1530 to 1565 nm).

The output lights from the first-group optical transmitters 11-L1 to 11-LN are combined by the first wavelength combiner 12-1. The output lights from the second-group optical transmitters 11-C1 to 11-CN are combined by the second wavelength combiner 12-2. The output lights from the third-group optical transmitters 11-S1 to 11-SN are combined by the third wavelength combiner 12-3. The first wavelength combiner 12-1, the second wavelength combiner 12-2, and the third wavelength combiner 12-3 have the same function and configuration, and each of them multiplexes a plurality of inputted wavelength channels and outputs the multiplexed signal.

The output signal of the first wavelength combiner 12-1 is amplified by the first optical amplifier 13-1. The output signal of the second wavelength combiner 12-2 is amplified by the second optical amplifier 13-2. The output signal of the third wavelength combiner 12-3 is amplified by the third optical amplifier 13-3. The first optical amplifier 13-1, the second optical amplifier 13-2, and the third optical amplifier 13-3 have the same function and configuration, and each of them amplifies the combined C-band optical signal.

The C-band optical signal amplified by the first optical amplifier 13-1 is subjected to wavelength conversion at the first wavelength converter 30-1 and the wavelength-converted optical signal is input to the wavelength combiner 16. In this example, all the channels included in the C-band optical signal are collectively converted into the L-band optical signal by the first wavelength converter 30-1.

The C-band optical signal amplified by the third optical amplifier 13-3 is subjected to wavelength conversion at the second wavelength converter 30-2 and the wavelength-converted optical signal is input to the wavelength combiner 16. In this example, all the channels included in the C-band optical signal are collectively converted into the S-band optical signal by the second wavelength converter 30-2.

The C-band optical signal amplified by the second optical amplifier 13-2 is directly input to the wavelength combiner 16 without undergoing wavelength conversion. The wavelength combiner 16 combines the L-band, the C-band, and the S-band optical signals, and outputs a WDM signal to the optical transmission line 18. This WDM signal includes wavelength channels ranging from the L-band to the S-band, and wideband optical communication is performed. The WDM signal travels through the optical transmission line 18 and is received by the optical communication apparatus 20.

The optical signal received at the optical communication apparatus 20 is demultiplexed by the wavelength demultiplexer 26 into L-band, C-band, and S-band optical signals. The L-band optical signal is converted into C-band optical signal by the third wavelength converter 30-3, amplified by the optical amplifier 23-1, and then split into different wavelength channels by the first wavelength demultiplexer 22-1.

The S-band optical signal is converted into C-band optical signal by the fourth wavelength converter 30-4, amplified by the optical amplifier 23-3, and then split into different wavelength channels by the third wavelength demultiplexer 22-3. The C-band optical signal is directly amplified by the optical amplifier 23-2 without undergoing wavelength conversion, and split into different wavelength channels by the second wavelength demultiplexer 22-2. The optical amplifiers 23-1 to 23-3 have the same function and configuration. The wavelength demultiplexers 22-1 to 22-3 have the same function and configuration, and each of them demultiplexes the C-band optical signal in this example into different wavelength channels.

The signal lights demultiplexed by the first wavelength demultiplexer 22-1 are supplied to the first-group optical receivers 21-L1 to 21-LN. The signal lights demultiplexed by the second wavelength demultiplexer 22-2 are supplied to the second-group optical receivers 21-C1 to 21-CN. The signal lights demultiplexed by the third wavelength demultiplexer 22-3 are supplied to the third-group optical receivers 21-S1 to 21-SN. The optical receivers 21-L1 to 21-LN, the optical receivers 21-C1 to 21-CN, and the optical receivers 21-S1 to 21-SN may be collectively referred to as "optical receivers 21".

The optical receivers 21 may be, for example, optical to electrical converting frontend circuits of optical transponders. The plurality of optical receivers 21 have the same configuration, and are configured to convert, for example, C-band wavelength channels (1530 to 1565 nm) into electric signals.

In the fiber-optic transmission system 1, common optical transmitters/receivers, common wavelength duplexers, common optical amplifiers or the like are used, instead of using different optical components for the individual bands. By using the wavelength converters 30-1 to 30-4, adverse influence such as frequency-dependent polarization rotation or polarization-dependent wavelength dispersion due to birefringence generated in the NLF wound around a small reel can be reduced, and the wavelength conversion efficiency can be maintained high over predetermined wavelength band.

Several examples of the wavelength converter are illustrated below. In the following description, one of the two polarized waves is referred to as "first polarized wave" and the other is referred to as "second polarized wave", regardless of the polarization direction. The same elements or components are denoted by the same numerical symbols, and redundant explanation may be omitted.

First Embodiment

Figure 5:
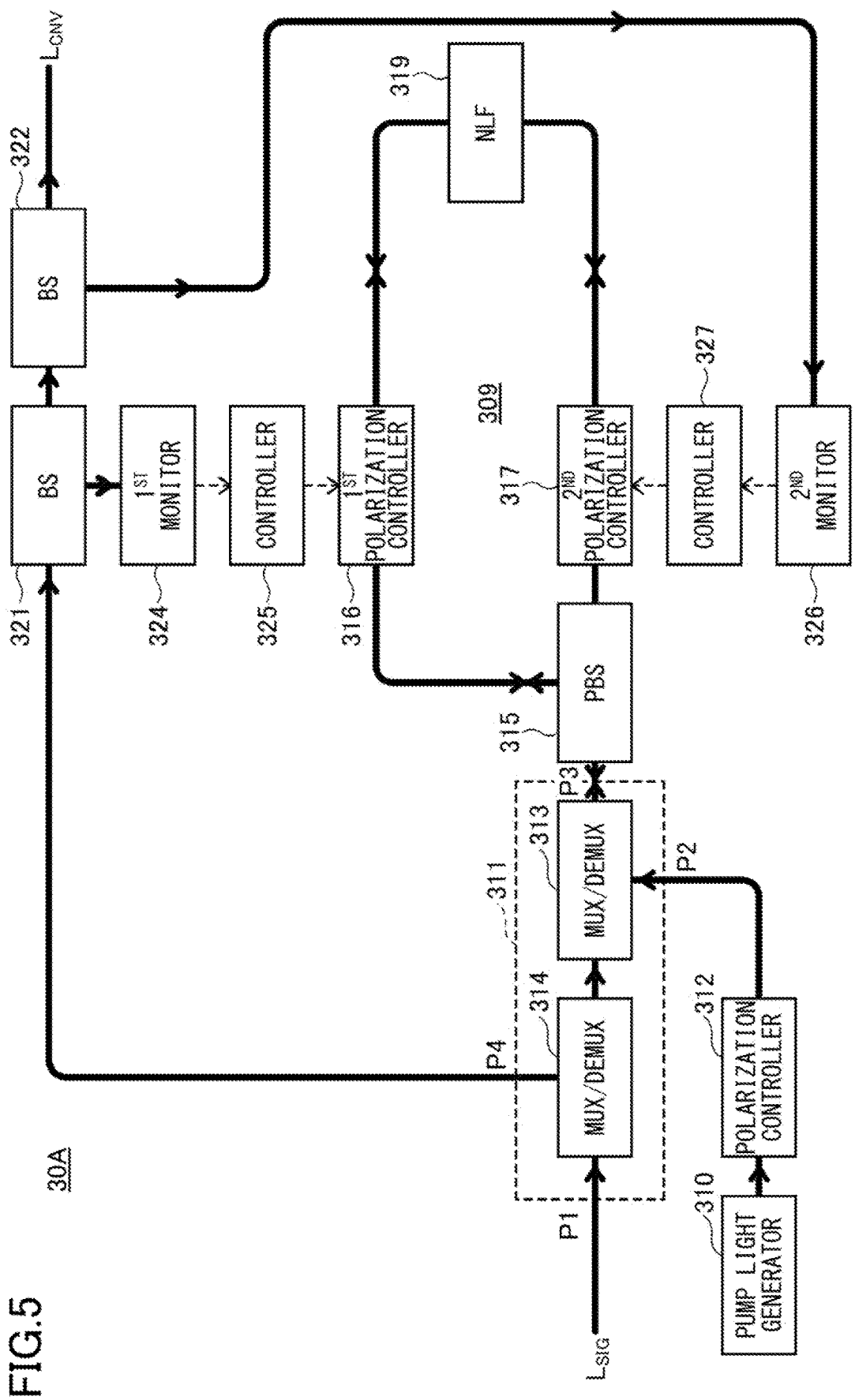
FIG. 5 is a schematic diagram of a wavelength converter according to the first embodiment.

FIG. 5 is a schematic diagram of a wavelength converter 30A of the first embodiment. The wavelength converter 30A has a PBS 315, an NLF 319, a first polarization controller 316 provided between the PBS 315 and one end of the NLF 319, and a second polarization controller 317 provided between the PBS 315 and the other end of the NLF 319. The PBS 315, the first polarization controller 316, the NLF 319, and the second polarization controller 317 are connected by an SMF to form an optical loop 309.

The wavelength converter 30A also has an optical multiplexer/demultiplexer 311 which includes a first multiplexer/demultiplexer 313 and a second multiplexer/demultiplexer 314. The optical multiplexer/demultiplexer 311 has a first port P1 configured to input signal light $L_{SIG}$, a second port P2 configured to input pump light, a third port P3 configured to output the signal light $L_{SIG}$ and the pump light to the PBS 315, and a fourth port P4 configured to output converted light $L_{CNV}$. More specifically, the signal light $L_{SIG}$ input to the first port P1 is transmitted through the second multiplexer/demultiplexer 314 as it is and is incident on the first multiplexer/demultiplexer 313. The pump light output from a pump light generator 310 undergoes polarization adjustment by the polarization controller 312 and is incident on the first multiplexer/demultiplexer 313 through the second port P2. At the first multiplexer/demultiplexer 313, the signal light $L_{SIG}$ and the pump light are combined and input to the PBS 315.

The input light containing the signal light $L_{SIG}$ and the pump light is split by the PBS 315 into two polarized waves orthogonal to each other, which travel through the optical loop 309 in opposite directions. The first polarized wave, which is reflected by the PBS 315 and travels in the clockwise direction, is subjected to polarization control at the first polarization controller 316, and is incident on the NLF 319. During propagation in the NLF 319, the signal light and the pump light interact with the NLF 319, and a new frequency component is generated. The light wave emitted from the NLF 319 is adjusted by the second polarization controller 317 such that the polarization axis of the light wave matches with the transmission axis of the PBS 315.

The second polarized wave, which is transmitted through the PBS 315 and travels along the optical loop 309 in the counterclockwise direction, is subjected to polarization control at the second polarization controller 317, and is incident on the NLF 319. During propagation in the NLF 319, a new frequency component is generated by interaction between the NLF 319 and the travelling light. The light wave emitted from the NLF 319 in the counterclockwise direction is adjusted by the first polarization controller 316 such that the polarization axis matches with the reflection axis of the PBS 315.

Among the light waves combined after the wavelength conversion by the PBS 315, the converted light $L_{CNV}$ is transmitted through the first multiplexer/demultiplexer 313 as it is and is incident on the second multiplexer/demultiplexer 314. The converted light $L_{CNV}$ is then output from the fourth port P4 at the second multiplexer/demultiplexer 314. The light components other than the converted light $L_{CNV}$, namely, the signal light $L_{SIG}$, the pump light, and frequency components other than the target wavelength may be removed from the second port P2 at the first multiplexer/demultiplexer 313.

The wavelength converter 30A may have a control system connected to the fourth port P4. One control circuit includes a beam splitter (BS) 321, a first monitor 324 and a controller 325, and is configured to control the behavior of the first polarization controller 316. Another control circuit includes a BS 322, a second monitor 326 and a controller 327, and is configured to control the behavior of the second polarization controller 317. In the figure, the thick solid lines represent optical paths, and the broken lines represent electric signal paths.

The BS 321 branches a portion of the converted light $L_{CNV}$. The first monitor 324 measures the power of the branched converted light $L_{CNV}$, and outputs a monitor signal. Based upon the monitoring result of the first monitor 324, the controller 325 controls the amount of adjustment for the first polarization controller 316, for example, the rotation angle of the polarization axis of a HWP or a QWP. The BS 322 branches another portion of the converted light $L_{CNV}$ having passed through the BS 321. The second monitor 326 measures the power of the branched converted Light $L_{CNV}$, and outputs a monitor signal. Based upon the monitoring result of the second monitor 326, the controller 327 controls the amount of adjustment for the second polarization controller 317, for example, the rotation angle of the polarization axis of a HWP or a QWP.

The control system does not necessarily include two control circuits, and a common configuration may be employed in which a common beam splitter is used in place of the BS 321 and the BS 322, a common monitor is used in place of the first monitor 324 and the second monitor 326, and the monitoring result is supplied to the controllers 325 and 327. The controllers 325 and 327 may be implemented as a logic device such as a field programmable gate array (FPGA), or a microprocessor.

With the configuration of the first embodiment, frequency-dependent polarization mismatching can be suppressed and the wavelength conversion efficiency can be improved, even when compressive stress is applied to the NLF 319.

Figure 6:
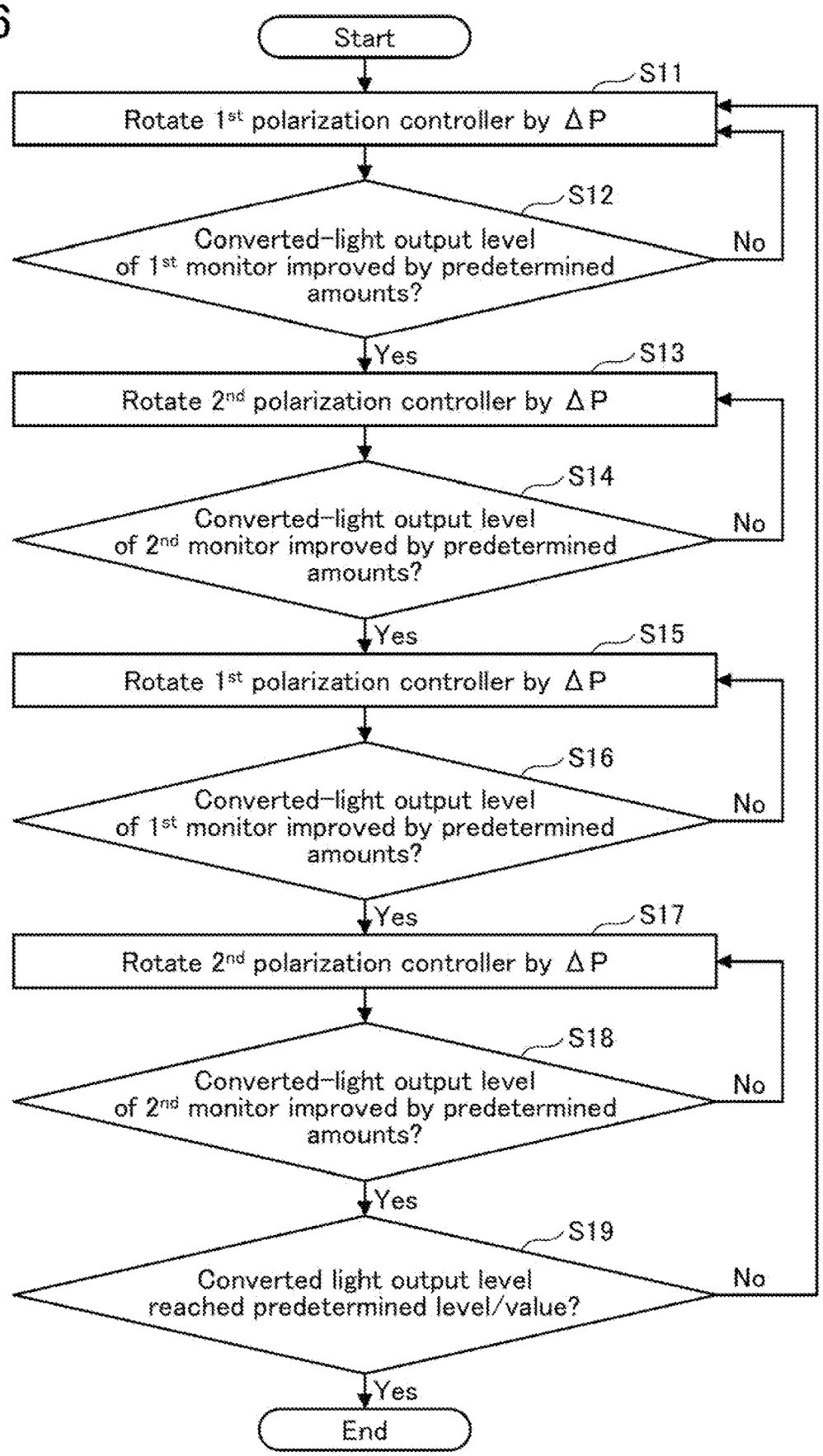
FIG. 6 is a flowchart illustrating an example of polarization control.

FIG. 6 is a flowchart of polarization control according to the first embodiment. This processing flow illustrates a control focusing on only one of the polarized waves, and is executed by the controller 325 or 327. After the control on one of the polarized waves is completed, the same control is performed on the other polarized wave. First, the first polarization controller 316 is rotated by a predetermined angle ΔP (S11). The control step size, that is, the predetermined angle ΔP of rotation is determined in advance.

It is determined whether the characteristic (e.g., the output power) of the converted light $L_{CNV}$ measured by the first monitor 324 has been improved by a predetermined degree or more (S12). If the predetermined degree of improvement has not been made (No in S12), the process returns to S11 and the first polarization controller 316 is further rotated. When the characteristic of the converted light $L_{CNV}$ has been improved by the predetermined degree or more (Yes in S12), then the second polarization controller 317 is rotated by the predetermined angle ΔP (S13). The control step size ΔP of the second polarization controller 317 may be the same as or different from the control step size ΔP of the first polarization controller 316.

Then, it is determined whether the characteristic such as the output power of the converted light $L_{CNV}$ measured by the second monitor 326 has been improved by a predetermined degree or more (S14). If the predetermined degree of improvement has not been made (No in S14), the process returns to S13 and the second polarization controller 317 is further rotated. When the characteristic of the converted light $L_{CNV}$ measured by the second monitor 326 has been improved by the predetermined degree or more (Yes in S14), the first polarization controller 316 is rotated again by the predetermined angle ΔP (S15). The control is continued in the same direction until the characteristic of the converted light $L_{CNV}$ measured by the first monitor 324 has been improved by the predetermined degree or more (Yes in S16).

Then, the second polarization controller 317 is rotated again (S17), and the control is continued in the same direction until the characteristic of the converted light $L_{CNV}$ measured by the second monitor 326 has been improved by the predetermined degree or more (Yes in S18). When the characteristic (such as the output power) of the converted light $L_{CNV}$ has reached the final target value (Yes in S19), the control on the current polarization is terminated, and the same control is performed on the other polarization. If the final target value has not been acquired (No in S19), the steps S11 to S19 are repeated.

The reason why the same process is repeated at each of the first polarization controller 316 and the second polarization controller 317 is to prevent the characteristic value of the converted light $L_{CNV}$ from converging to a local maximum or a local minimum. In the control flow of FIG. 6, each of the polarized waves travelling through the optical loop 309 is controlled so to be the optimum polarization state, and the wavelength conversion efficiency is improved.

Second Embodiment

Figure 7:
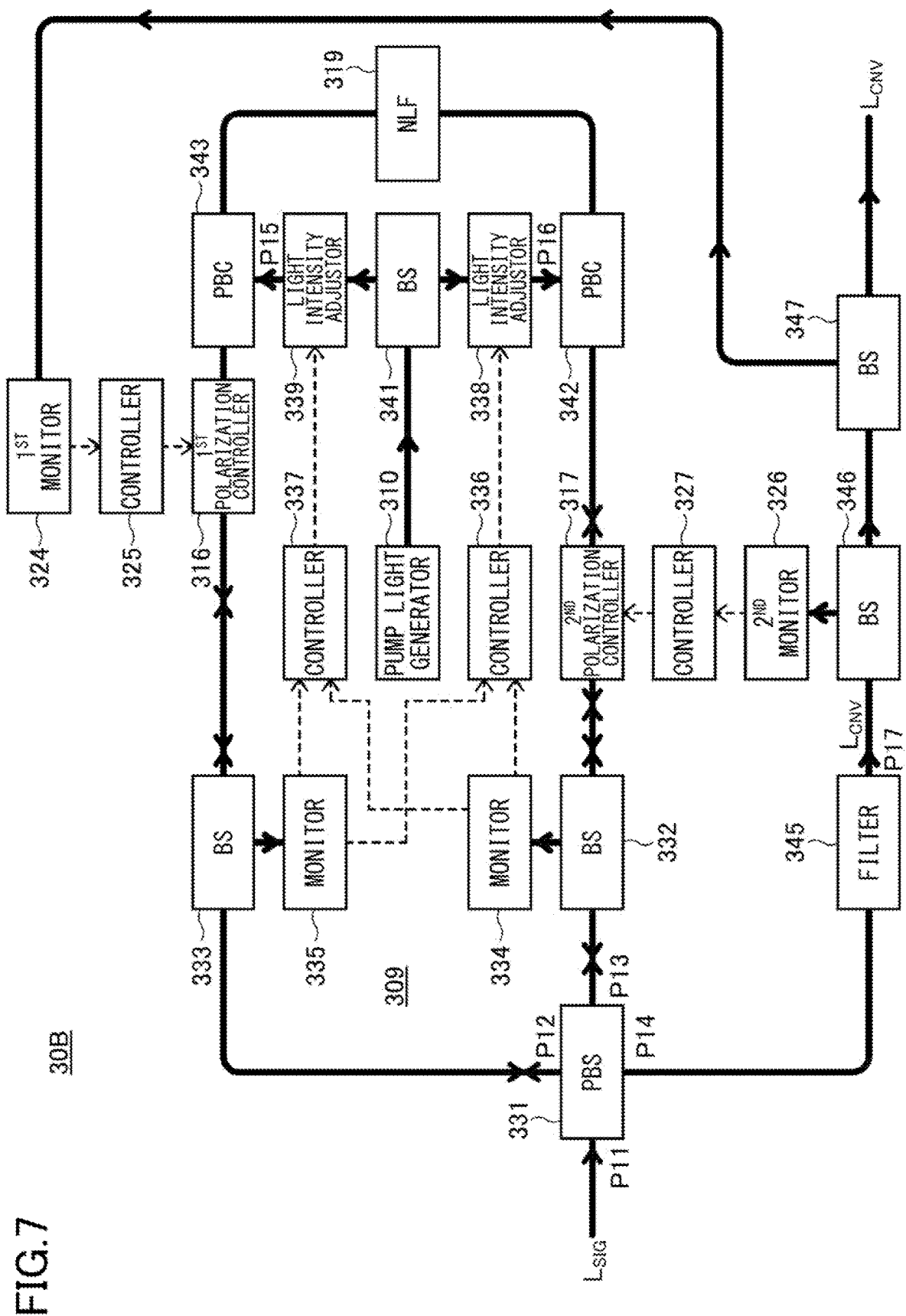
FIG. 7 is a schematic diagram of a wavelength converter according to the second embodiment.

FIG. 7 is a schematic diagram of a wavelength converter 30B of the second embodiment. The wavelength converter 30B has a PBS 331, an NLF 319, a first polarization controller 316 provided between the PBS 331 and one end of the NLF 319, and a second polarization controller 317 provided between the PBS 331 and the other end of the NLF 319. The PBS 331, the first polarization controller 316, the NLF 319, and the second polarization controller 317 are connected by an SMF to form an optical loop 309.

The PBS 331 has a first port P11 configured to input signal light $L_{SIG}$, a second port P12 configured to guide a first polarized wave of the signal light $L_{SIG}$ to the optical loop 309 in the clockwise direction, a third port P13 configured to guide a second polarized wave of the signal light $L_{SIG}$ to the optical loop 309 in the counterclockwise direction, and a fourth port P14 configured to output a light emitted from the optical loop 309. The polarization direction of the first polarized wave incident on the optical loop 309 from the second port P12 is controlled by the first polarization controller 316. The polarization direction of the second polarized wave incident on the optical loop 309 from the third port P13 is controlled by the second polarization controller 317.

The wavelength converter 30B also has a pump light generator 310, and pump light is guided together with the signal light $L_{SIG}$ to the NLF 319. In one configuration example, the pump light output from the pump light generator 310 is split into two, a first component and a second component, by a BS 341. One of the split pump light components is intensity-adjusted by the light intensity adjustor 339, and is combined at a polarization beam combiner (PBC) 343 with the first polarized wave travelling in the optical loop 309. The PBC 343 has an input port P15 configured to input the first component of the pump light. The other of the split pump light components is intensity-adjusted by the light intensity regulator 338 and combined at a PBC 342 with the second polarized wave travelling in the optical loop 309. The PBC 342 has an input port P16 configured to input the second component of the pump light.

By the interaction between the NLF 319 and the first polarized wave of the signal light and the first component of the pump light incident on the NLF 319 in the clockwise direction, a new frequency component is generated. The light wave emitted from the NLF 319 in the clockwise direction is controlled by the second polarization controller 317 such that the polarization direction matches with the reflection axis of the PBS 331. Similarly, by the interaction between the NLF 319 and the second polarized wave of the signal light and the second component of the pump light incident on the NLF 319 in the counterclockwise direction, a new frequency component is generated. The light wave emitted from the NLF 319 in the counterclockwise direction is controlled by the first polarization controller 316 such that the polarization direction matches with the transmission axis of the PBS 331.

The light wave that travels along the optical loop 309 in the clockwise direction and enters the third port P13 of the PBS 331 is reflected by the PBS 331 and output from the fourth port 14. The light wave that travels along the optical loop 309 in the counterclockwise direction and enters the second port P12 of the PBS 331 is transmitted through the PBS 331 and output from the fourth port P14. The light waves output from the fourth port P14 of the PBS 331 then enter a filter 345, and only the converted light $L_{CNV}$ is extracted. The output port of the filter 345 serves as an output port P17 for finally outputting the converted light $L_{CNV}$.

The wavelength converter 30B may have a BS 347, a first monitor 324 and a controller 325 which form a first control circuit to control the first polarization controller 316, and it may have a BS 346, a second monitor 326, and a controller 327 which form a second control circuit to control the second polarization controller 317. The controller 325 and the controller 327 may execute the control flow illustrated in FIG. 6.

The wavelength converter 30B may also have another control circuit for controlling the intensity of the pump light to be combined with the signal light $L_{SIG}$. For example, a combination of the BS 333 and the monitor 335 may measure the intensity of the first polarized wave, while a combination of the BS 332 and the monitor 334 may measure the intensity of the second polarized wave. The monitoring results may be supplied to the controller 336 and the controller 337 to control the light intensity adjustors 338 and 399, respectively. The electrical signal paths that supply the monitor signals and the control signals are represented by the dashed arrows in the figure.

With the configuration of the second embodiment, frequency-dependent polarization mismatching can be suppressed and the wavelength conversion efficiency can be improved even when compressive stress is applied to the NLF 319.

Third Embodiment

Figure 8:
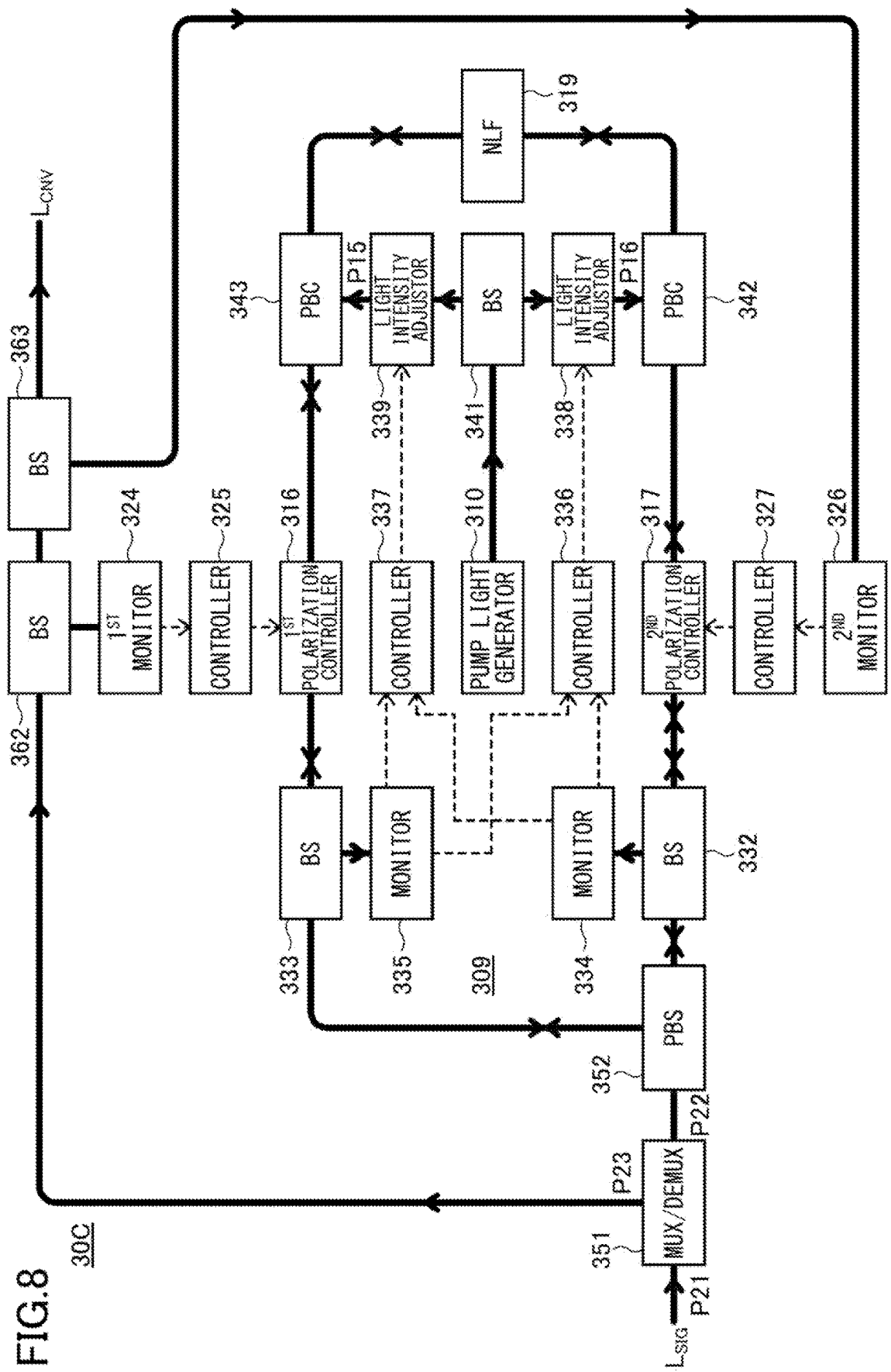
FIG. 8 is a schematic diagram of a wavelength converter according to the third embodiment.

FIG. 8 is a schematic diagram of a wavelength converter 30C of the third embodiment. The wavelength converter 30C has an optical multiplexer/demultiplexer 351, a PBS 352, an NLF 319, a first polarization controller 316 provided between the PBS 352 and one end of the NLF 319, and a second polarization controller 317 provided between the PBS 352 and the other end of the NLF 319. The PBS 352, the first polarization controller 316, the NLF 319, and the second polarization controller 317 are connected by an SMF to form an optical loop 309.

The optical multiplexer/demultiplexer 351 has a first port P21 configured to input signal light $L_{SIG}$, a second port P22 configured to transmit the signal light $L_{SIG}$ to the PBS 352, and a third port P23 configured to output converted light $L_{CNV}$. The PBS 352 guides a first polarized wave of the signal light $L_{SIG}$ to the optical loop 309 in the clockwise direction, and guides a second polarized wave to the optical loop 309 in the counterclockwise direction. The polarization direction of the first polarized wave is controlled by the first polarization controller 316, and the polarization direction of the second polarized wave is controlled by the second polarization controller 317.

As in the second embodiment, a pump light output from a pump light generator 310 is split by a BS 341 into two components, where one is combined with a first polarized wave by a PBC 343 and the other is combined with a second polarized wave by a PBC 342 before entering the NLF 319. The split pump light components may be intensity-adjusted by light intensity adjutors 339 and 338 before they are combined with the first and second polarized waves, respectively, of the signal light $L_{SIG}$.

From the signal light of the first polarized wave and the pump light incident on the NLF 319 in the clockwise direction, a new frequency component is generated by the nonlinear optical effect. The light wave emitted from the NLF 319 is controlled by the second polarization controller 317 such that the polarization direction matches with the transmission axis of the PBS 352. From the signal light of the second polarized wave and the pump light incident on the NLF 319 in the counterclockwise direction, a new frequency component is generated by the nonlinear optical effect. The light wave emitted from the NLF 319 in the counterclockwise direction is controlled by the first polarization controller 316 such that the polarization direction matches with the reflection axis of the PBS 352.

The light waves having been subjected to wavelength conversion and then combined at the PBS 352 enter the second port P22 of the optical multiplexer/demultiplexer 351, and converted light $L_{CNV}$ is extracted and output from the third port P23.

The wavelength converter 30C may have a BS 362, a first monitor 324 and a controller 325 which form a first control circuit for controlling the first polarization controller 316, and it may have a BS 363, a second monitor 326, and a controller 327 which form a second control circuit for controlling the second polarization controller 317. The controllers 325 and 327 may execute the control flow illustrated in FIG. 6. The wavelength converter 30C may also have a control system for controlling the intensity of the pump light. Such a control system may include a circuit with a BS 333, a monitor 335, a controller 337 and a light-intensity adjustor 339, and a circuit with a BS 332, a monitor 334, a controller 336 and a light-intensity adjustor 338.

With the configuration of the third embodiment, frequency-dependent polarization mismatching can be suppressed and the wavelength conversion efficiency can be improved even when compressive stress is applied to the NLF 319.

Fourth Embodiment

Figure 9:
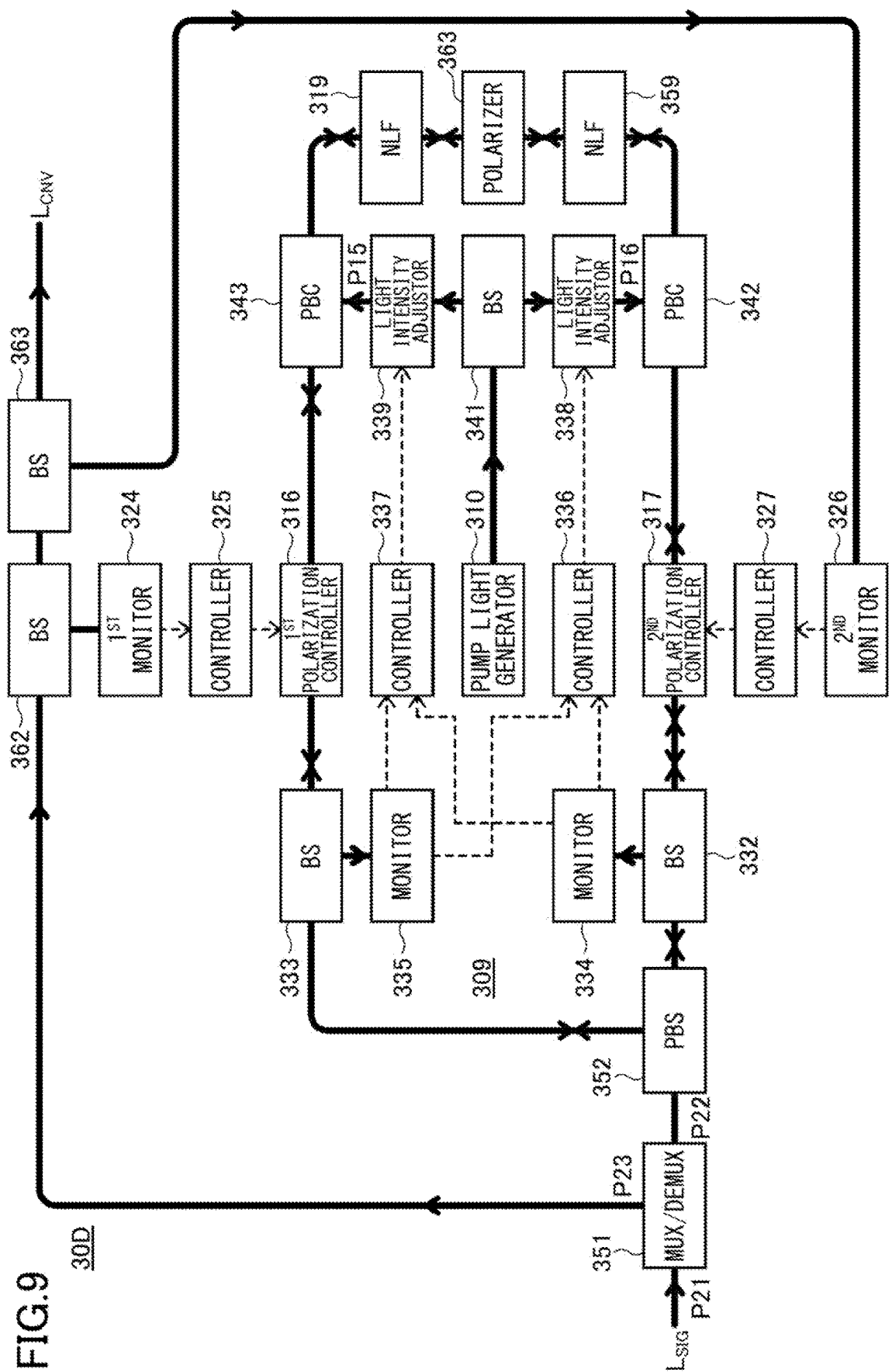
FIG. 9 is a schematic diagram of a wavelength converter according to the fourth embodiment.

FIG. 9 is a schematic diagram of a wavelength converter 30D of the fourth embodiment. The wavelength converter 30D has an NLF 319, an NLF 359, and a polarizer 363 provided between the NLF 319 and the NLF 359 in an optical loop 309. The rest of the configuration is the same as that of the wavelength converter 30C illustrated in FIG. 8. The same elements as those in FIG. 8 are denoted by the same numerical symbols and redundant explanation will be omitted.

The polarization state of the first polarized wave of the signal light $L_{SIG}$ split by the PBS 352 is controlled by the first polarization controller 316, and is combined with a pump light at the PBC 343. After the first polarized wave of the signal light $L_{SIG}$ and the pump light undergo the nonlinear optical process in the NLF 319, the polarization direction of the light wave emitted from the NLF 319 is controlled into one direction by the polarizer 363, and again undergoes the nonlinear optical process in the NLF 359. By the interaction between the light and the nonlinear optical media in the NLF 319 and the NLF 359, one or more new frequency components are generated. The polarization state of the light wave emitted from the NLF 359 is controlled by the second polarization controller 317 and enters the transmission port of the PBS 352.

The polarization state of the second polarized wave of the signal light $L_{SIG}$ is controlled by the second polarization controller 317, and is combined with a pump light at the PBC 342. After the second polarized wave of the signal light $L_{SIG}$ and the pump light undergo the nonlinear optical process in the NLF 359, the polarization direction of the light wave emitted from the NLF 359 is controlled into one direction by the polarizer 363, and again undergoes the nonlinear optical process in the NLF 319. By the interaction between the light and the nonlinear optical media in the NLF 359 and the NLF 319, one or more new frequency components are generated. The polarization state of the light wave emitted from the NLF 319 is controlled by the first polarization controller 316 and enters the reflection port of the PBS 352.

The light waves combined at the PBS 352 enter the second port P22 of the optical multiplexer/demultiplexer 351, and converted light $L_{CNV}$ is extracted and output from the third port P23 of the optical multiplexer/demultiplexer 351. By providing the polarizer 363 between the NLF 319 and the NLF 359 in the wavelength converter 30D, unnecessary polarization components are removed and noise caused by the wavelength conversion is reduced. Consequently, the wavelength conversion efficiency can be improved. As has been described above, the first polarization controller 316 and the second polarization controller 317 can maintain the conversion efficiency high even when frequency-dependent polarization rotation may occur.

Fifth Embodiment

Figure 10:
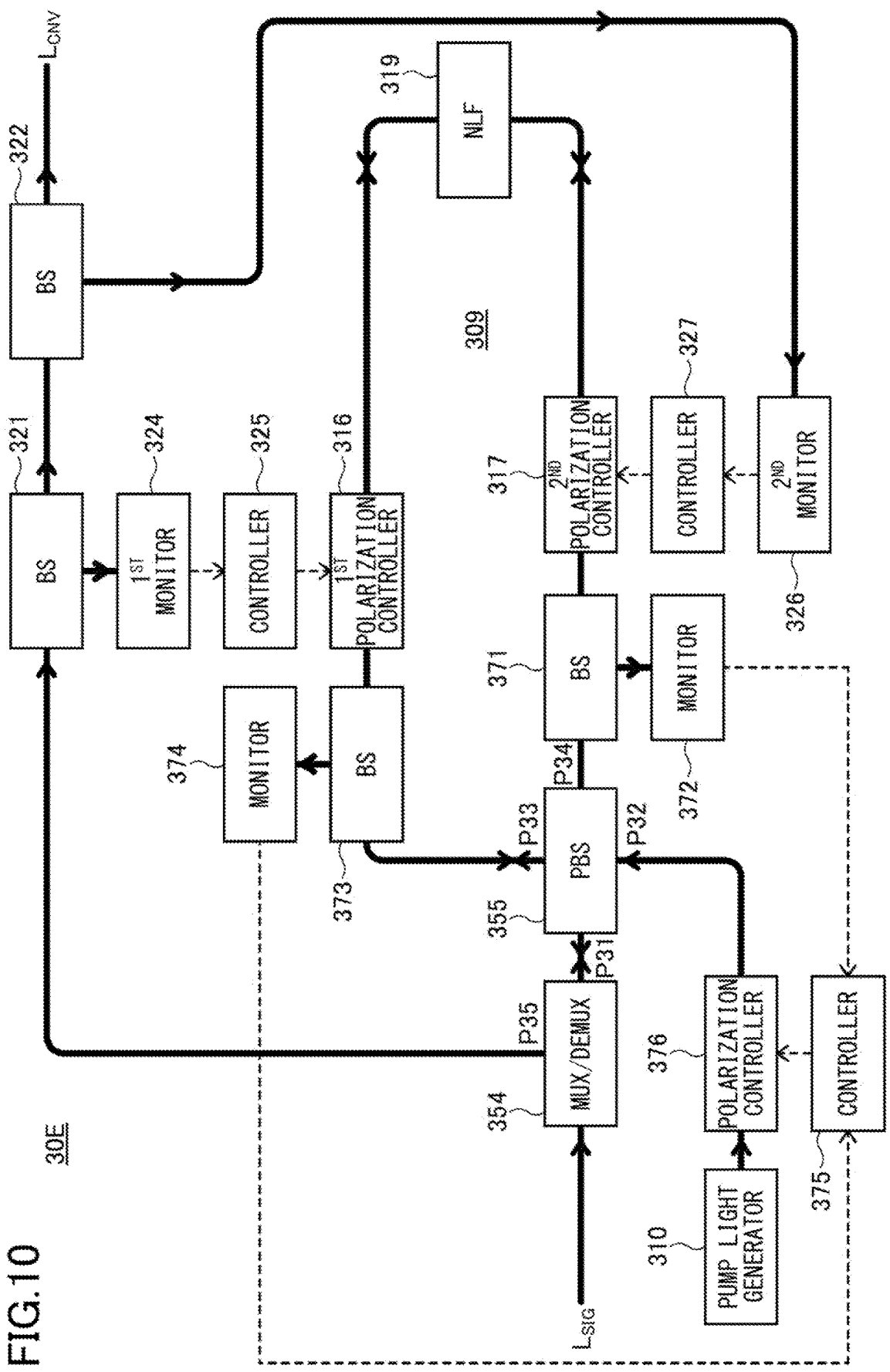
FIG. 10 is a schematic diagram of a wavelength converter according to the fifth embodiment.

FIG. 10 is a schematic diagram of a wavelength converter 30E of the fifth embodiment. The wavelength converter 30E has an optical multiplexer/demultiplexer 354, a PBS 355, an NLF 319, a first polarization controller 316 provided between the PBS 355 and one end of the NLF 319, and a second polarization controller 317 provided between the PBS 355 and the other end of the NLF 319. The PBS 355, the first polarization controller 316, the NLF 319, and the second polarization controller 317 are connected by an SMF to form an optical loop 309.

The PBS 355 has a first port P31 configured to input signal light $L_{SIG}$, a second port P32 configured to input a pump light, a third port P33 configured to guide a first polarized wave to the optical loop 309 in the clockwise direction, and a fourth port P34 configured to guide a second polarized wave to the optical loop 309 in the counterclockwise direction. An optical multiplexer/demultiplexer 354 has an output port P35 configured to output converted light $L_{CNV}$.

The wavelength converter 30E also has a pump light generator 310 and a polarization controller 376 that controls the angle of the polarization axis of the pump light output from the pump light generator 310. The pump light generator 310 outputs linearly polarized pump light. The behavior of the polarization controller 376 is controlled by a control circuit including, for example, BSs 371 and 373, monitors 372 and 374, and a controller 375.

The BS 371 branches a portion of the light emitted from NLF 319 in the clockwise direction, and the power of the branched light is measured by the monitor 372. The BS 373 branches a portion of the light emitted from the NLF 319 in the counterclockwise direction, and the power of the branched light is measured by the monitor 374. Based upon the output signals of the monitors 372 and 374, the controller 375 controls the angle of the polarization controller 376 such that the pump light is incident on the PBS 355 at an angle of 45 degrees with respect to the transmission axis of the second port P32 of the PBS 355.

By entering the PBS 355 at an angle of 45 degrees with respect to the optical axis of the PBWS 355, the pump light is evenly split into two polarized waves orthogonal to each other. The intensity of the light wave undergoing the nonlinear optical process in the clockwise direction and the intensity of the light wave undergoing the nonlinear optical process in the counterclockwise direction become almost the same. The light waves having been subjected to the nonlinear process and then combined at the PBS 355 are incident through the first port P31 of the PBS 355 onto the optical multiplexer/demultiplexer 354, at which converted light $L_{CNV}$ is extracted and output from the output port P35.

With the configuration of the fifth embodiment, influence of the frequency-dependent polarization rotation can be corrected, and the wavelength conversion efficiency can be improved.

Sixth Embodiment

Figure 11:
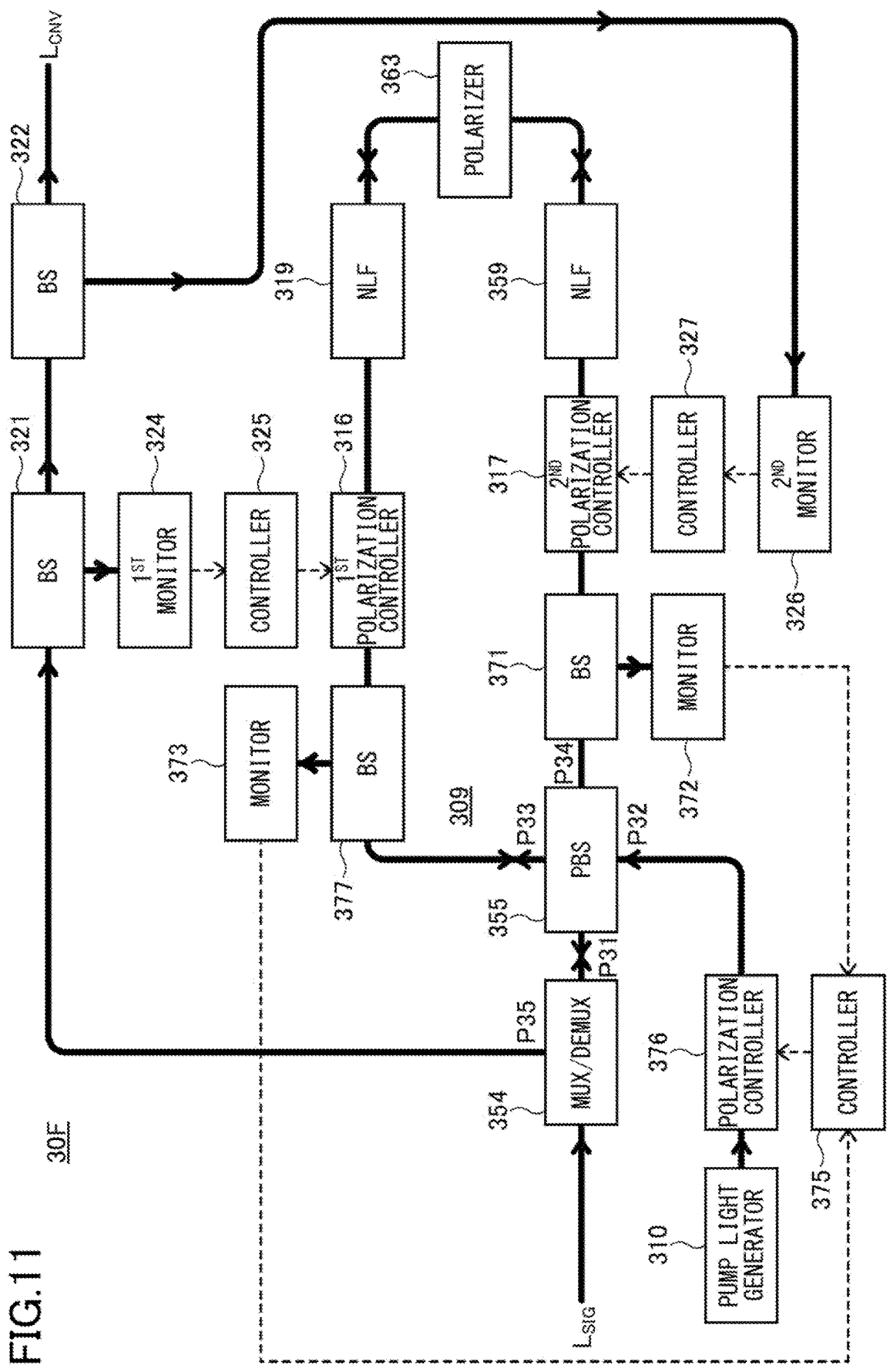
FIG. 11 is a schematic diagram of a wavelength converter according to the sixth embodiment.

FIG. 11 is a schematic diagram of a wavelength converter 30F of the sixth embodiment. The wavelength converter 30F has an NLF 319, an NLF 359, and a polarizer 363 provided between the NLF 319 and the NLF 359 in an optical loop 309. The rest of the configuration is the same as that of the wavelength converter 30E illustrated in FIG. 10. The same elements as those in FIG. 10 are denoted by the same numerical symbols and redundant explanation will be omitted.

By providing the polarizer 363 between the NLF 319 and the NLF 359 in the wavelength converter 30F, unnecessary polarization components are removed and the wavelength conversion efficiency can be improved. Because the polarization axis of the pump light incident on the PBS 355 is controlled to make an angle of 45 degrees with respect to the transmission axis of the second port P32 of the PBS 355, the pump light is split into two orthogonal polarizations approximately evenly.

By providing the first polarization controller 316 and the second polarization controller 317 at the input side and the output side, respectively, of the nonlinear optical process, the wavelength conversion efficiency can be maintained high even when frequency-dependent polarization rotation occurs in at least one of the NLF 319 and the NLF 359.

Although the embodiments have been described above based on the specific examples, the present disclosure is not limited to the above-described examples. The configurations of the first to sixth embodiments can be combined with each other. For example, the control flow of the first embodiment (in FIG. 6) is applicable to all the embodiments. The configuration in which a polarizer is placed between two NLFs (FIG. 9 and FIG. 11) may be applied to all the other embodiments. The control flow of FIG. 6 may be performed periodically, or when the wavelength converter 30 is installed or restarted. With any one of the configurations of the embodiments, the wavelength converter 30 can be downsized while the wavelength conversion efficiency is improved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority or inferiority of the invention. Although the embodiments of the present inventions have been described in detail, it should be understood that the various changes, substitutions, and alterations could be made hereto without departing from the spirit and scope of the invention.

What is claimed is:

1. A wavelength converter comprising:
   an input port configured to input a signal light and a pump light;
   an output port configured to output a converted light having a wavelength component different from the signal light and from the pump light;
   a nonlinear optical fiber that has a nonlinear optical effect;
   a polarization beam splitter configured to split incident light into a first polarized wave and a second polarized wave;
   a first polarization controller provided between the polarization beam splitter and a first end of the nonlinear optical fiber a second polarization controller provided between the polarization beam splitter and a second end of the nonlinear optical fiber; and
   a control circuit configured to monitor a characteristic of the converted light and control a first amount of rotation of the first polarization controller and a second amount of rotation of the second polarization controller,
   wherein in an optical loop connecting the polarization beam splitter, the first polarization controller, the nonlinear optical fiber, and the second polarization controller, the first polarized wave and a first component of the pump light travel through the nonlinear optical fiber in a first direction, and the second polarized wave and a second component of the pump light travel through the nonlinear optical fiber in a second direction opposite to the first direction, and
   wherein the control circuit is connected to monitor to monitor power of the converted light output from the optical loop, and controls a polarization state of the converted light in the first direction with the first polarization controller and a polarization state of the converted light in the second direction with the second polarization controller based on the power of the converted light output from the optical loop.

2. The wavelength converter as claimed in claim 1, wherein the nonlinear optical fiber includes a first nonlinear optical fiber and a second nonlinear optical fiber,
   wherein the first polarization controller is provided between the polarization beam splitter and the first nonlinear optical fiber, and the second polarization controller is provided between the polarization beam splitter and the second nonlinear optical fiber.

3. The wavelength converter as claimed in claim 2, comprising:
   a polarizer provided between the first nonlinear optical fiber and the second nonlinear optical fiber.

4. The wavelength converter as claimed in claim 1, comprising:
   an optical multiplexer/demultiplexer provided outside the optical loop and optically connected to the polarization beam splitter,
   wherein the optical multiplexer/demultiplexer has a first port configured to input the signal light, a second port configured to input the pump light, a third port configured to guide the signal light and the pump light to the polarization beam splitter, and a fourth port configured to extract and output the converted light from an output of the optical loop.

5. The wavelength converter as claimed in claim 1, wherein the polarization beam splitter has a first port configured to input the signal light, a second port configured to input the first polarized wave into the optical loop in the first direction, a third port configured to input the second polarized wave into the optical loop in the second direction, and a fourth port configured to output the converted light from the optical loop.

6. The wavelength converter as claimed in claim 5, wherein the optical loop has a first input port configured to input the first component of the pump light into the optical loop in the first direction, and a second input port configured to input the second component of the pump light into the optical loop in the second direction.

7. The wavelength converter as claimed in claim 1, comprising:
   an optical multiplexer/demultiplexer provided outside the optical loop and optically connected to the polarization beam splitter,
   wherein the optical multiplexer/demultiplexer has a first port configured to input the signal light, a second port configured to guide the signal to the polarization beam splitter, and a third port configured to output the converted light, and
   wherein an output light of the optical loop travels from the polarization beam splitter, through the second port, and is incident on the optical multiplexer/demultiplexer at which the converted light is separated and output from the third port.

8. The wavelength converter as claimed in claim 1, wherein the control circuit controls the first polarization controller and the second polarization controller so as to maximize a power of the converted light output from the optical loop.

9. A wavelength converter comprising:
   an input port configured to input a signal light and a pump light;
   an output port configured to output a converted light having a wavelength component different from the signal light and from the pump light;
   a nonlinear optical fiber that has a nonlinear optical effect;
   a polarization beam splitter configured to split incident light into a first polarized wave and a second polarized wave;
   a first polarization controller provided between the polarization beam splitter and a first end of the nonlinear optical fiber; and
   a second polarization controller provided between the polarization beam splitter and a second end of the nonlinear optical fiber,
   wherein in an optical loop connecting the polarization beam splitter, the first polarization controller, the nonlinear optical fiber, and the second polarization controller, the first polarized wave and a first component of the pump light travel through the nonlinear optical fiber in a first direction, and the second polarized wave and a second component of the pump light travel through the nonlinear optical fiber in a second direction opposite to the first direction,
wherein the second polarization controller is configured to bring a polarization direction of light output from the polarization beam splitter and incident on the nonlinear optical fiber in the second direction to be matching with an optical axis determined by birefringence generated in the nonlinear optical fiber, and
wherein the first polarization controller is configured to bring a polarization axis of the light output from the nonlinear optical fiber in the second direction to be matching with a first axis of the polarization beam splitter.

10. A wavelength converter comprising:
an input port configured to input a signal light and a pump light;
an output port configured to output a converted light having a wavelength component different from the signal light and from the pump light;
a nonlinear optical fiber that has a nonlinear optical effect;
a polarization beam splitter configured to split incident light into a first polarized wave and a second polarized wave;
a first polarization controller provided between the polarization beam splitter and a first end of the nonlinear optical fiber; and
a second polarization controller provided between the polarization beam splitter and a second end of the nonlinear optical fiber,
wherein in an optical loop connecting the polarization beam splitter, the first polarization controller, the nonlinear optical fiber, and the second polarization controller, the first polarized wave and a first component of the pump light travel through the nonlinear optical fiber in a first direction, and the second polarized wave and a second component of the pump light travel through the nonlinear optical fiber in a second direction opposite to the first direction,
wherein the wavelength converter has
an optical multiplexer/demultiplexer provided outside the optical loop and optically connected to the polarization beam splitter,
wherein the polarization beam splitter has a first port configured to input the signal light supplied from the optical multiplexer/demultiplexer, a second port configured to input the pump light, a third port configured to input the first polarized wave and the first component of the pump light into the optical loop in the first direction, and a fourth port configured to input the second polarized wave and the second component of the pump light into the optical loop in the second direction, and
wherein an output light of the optical loop is supplied from the first port to the optical multiplexer/demultiplexer, and the converted light is separated at and output from the optical multiplexer/demultiplexer.

11. The wavelength converter as claimed in claim 10, comprising:
a third polarization controller connected to the second port of the polarization beam splitter and configured to control a polarization state of the pump light.

12. The wavelength converter as claimed in claim 11, wherein the pump light is a linearly polarized light, and the third polarization controller is configured to control the linearly polarized light such that a linear polarization axis is at an angle of 45 degrees with respect to a transmitting axis of the second port of the polarization beam splitter.

13. A wavelength converter comprising:
an input port configured to input a signal light and a pump light;
an output port configured to output a converted light having a wavelength component different from the signal light and from the pump light;
a nonlinear optical fiber that has a nonlinear optical effect;
a polarization beam splitter configured to split incident light into a first polarized wave and a second polarized wave;
a first polarization controller provided between the polarization beam splitter and a first end of the nonlinear optical fiber; and
a second polarization controller provided between the polarization beam splitter and a second end of the nonlinear optical fiber,
wherein in an optical loop connecting the polarization beam splitter, the first polarization controller, the nonlinear optical fiber, and the second polarization controller, the first polarized wave and a first component of the pump light travel through the nonlinear optical fiber in a first direction, and the second polarized wave and a second component of the pump light travel through the nonlinear optical fiber in a second direction opposite to the first direction, and
wherein the polarization beam splitter, the first polarization controller, the nonlinear optical fiber, and the second polarization controller are connected by a single-mode optical fiber.

14. A wavelength converter comprising:
an input port configured to input a signal light and a pump light;
an output port configured to output a converted light having a wavelength component different from the signal light and from the pump light;
a nonlinear optical fiber that has a nonlinear optical effect;
a polarization beam splitter configured to split incident light into a first polarized wave and a second polarized wave;
a first polarization controller provided between the polarization beam splitter and a first end of the nonlinear optical fiber; and
a second polarization controller provided between the polarization beam splitter and a second end of the nonlinear optical fiber,
wherein in an optical loop connecting the polarization beam splitter, the first polarization controller, the nonlinear optical fiber, and the second polarization controller, the first polarized wave and a first component of the pump light travel through the nonlinear optical fiber in a first direction, and the second polarized wave and a second component of the pump light travel through the nonlinear optical fiber in a second direction opposite to the first direction, and
wherein the nonlinear optical fiber is wound around a reel that has a diameter of $1/2000$ to $1/10000$ of a length of the nonlinear optical fiber.

15. A fiber-optic transmission system comprising:
a first optical communication apparatus configured to convert an optical signal of a first wavelength band into an optical signal of a second wavelength band that is different from the first wavelength band using a wavelength converter, and output the optical signal of the second wavelength band into an optical transmission line; and a second optical communication apparatus configured to receive the optical signal of the second wavelength band from the optical transmission line, and convert the optical signal of the second wavelength band into the optical signal of the first wavelength band using the wavelength converter, wherein the wavelength converter includes an input port configured to input a signal light and a pump light, an output port configured to output a converted light having a wavelength component different from the signal light and from the pump light, a nonlinear optical fiber that has a nonlinear optical effect, a polarization beam splitter configured to split incident light into a first polarized wave and a second polarized wave, a first polarization controller provided between the polarization beam splitter and a first end of the nonlinear optical fiber, and a second polarization controller provided between the polarization beam splitter and a second end of the nonlinear optical fiber, wherein in an optical loop connecting the polarization beam splitter, the first polarization controller, the nonlinear optical fiber, and the second polarization controller, the first polarized wave and a first component of the pump light travel through the nonlinear optical fiber in a first direction, and the second polarized wave and a second component of the pump light travel through the nonlinear optical fiber in a second direction opposite to the first direction.

* * * * *